(12) United States Patent
Hashimoto (10) Patent No.: US 7,220,004 B2
(45) Date of Patent: May 22, 2007

(54) PROJECTOR

(75) Inventor: Akira Hashimoto, Shiojiri (JP)

(73) Assignee: Seiko Epson Corporation (JP)

( * ) Notice: Subject to any disclaimer, the term of this patent is extended or adjusted under 35 U.S.C. 154(b) by 117 days.

(21) Appl. No.: 10/972,840

(22) Filed: Oct. 22, 2004

(65) Prior Publication Data

US 2005/0134804 A1 Jun. 23, 2005

(30) Foreign Application Priority Data

Oct. 23, 2003 (JP) .............................. 2003-363432
Jun. 29, 2004 (JP) .............................. 2004-191358

(51) Int. Cl.
*G03B 21/00* (2006.01)
*G03B 21/20* (2006.01)

(52) U.S. Cl. .......................................... 353/31; 353/85

(58) Field of Classification Search .................. 353/31, 353/33, 74, 77, 97, 102; 348/800–802; 349/69, 349/62; 362/555, 551
See application file for complete search history.

(56) References Cited

U.S. PATENT DOCUMENTS 6,224,216 B1 * 5/2001 Parker et al. ................. 353/31
6,412,953 B1 * 7/2002 Tiao et al. ..................... 353/98
6,517,211 B2   2/2003 Mihara
6,547,400 B1 * 4/2003 Yokoyama .................... 353/98
6,678,023 B1 * 1/2004 Yamazaki et al. ............ 349/95
7,001,022 B2 * 2/2006 Kim et al. ..................... 353/31

FOREIGN PATENT DOCUMENTS

| JP | 2000-112031 | 4/2000 |
| JP | 2002-350973 | 4/2002 |
| JP | 2002-323670 | 11/2002 |

OTHER PUBLICATIONS

Examination result issued in corresponding Korean patent application.

* cited by examiner

*Primary Examiner*—Melissa Jan Koval
*Assistant Examiner*—Andrew Kong
(74) *Attorney, Agent, or Firm*—Harness, Dickey & Pierce, P.L.C.

(57) ABSTRACT

A projector is provided wherein the shapes of rod integrators for the respective colors (i.e., the shapes of the output ports thereof) are made nearly the same as the shapes of the effective pixel regions and the sizes of the output ports of the rod integrators for the respective colors are made slightly larger than the sizes of the effective pixel regions of the liquid crystal light valves opposed thereto. As a result, uniform illumination light output from the output ports can be caused to enter the effective pixel regions with no loss or damage to uniformity.

4 Claims, 8 Drawing Sheets

PROJECTOR

RELATED APPLICATIONS

This application claims priority to Japanese Patent Application Nos. 2003-363432 filed Oct. 23, 2003, and 2004-191358 filed Jun. 29, 2004 which are hereby expressly incorporated by reference herein in their entirety.

BACKGROUND

1. Technical Field

The present invention relates to a projector for projecting an image using an optical modulator unit such as a liquid crystal light valve or the like.

2. Related Art

One conventional projector illuminates a single liquid crystal panel at three different input angles by collecting white light from a light source with a concave mirror so as to allow it to enter one end of a rod integrator, and allowing the output light from the other end of the rod integrator to enter a dichroic mirror of a set of three mirrors via a lens (see JP-A-2002-323670).

Further, another conventional projector disposes a light source array so as to be opposed to one end of a light guide in a square bar shape and a liquid crystal panel is disposed so as to be opposed to the other end of the light guide, for allowing a light source beam from the light source array to directly enter the one end of the light guide and illumination light from the other end of the light guide to directly enter the liquid crystal panel (see FIGS. 6 and 7 of JP-A-2000-112031).

However, because the output light from the rod integrator is caused to enter the liquid crystal panel via the lens in the former projector, the illumination light that has been made uniform once becomes non-uniform again due to imaging accuracy of the lens or the like. Further, because a part of the output light from the rod integrator leaks outside of the liquid crystal panel, waste of illumination light is caused.

Further, because the light source beam from the light source array is allowed to directly enter the one end of the light guide in the latter projector, in the case where the size of the light source array exceeds the sectional size of the light guide, waste of the light source beam is caused. That is, in the case where the size of the unit light source is large, it becomes difficult to incorporate the light source in the light source array, and thereby, the option of selecting the size of the light source becomes narrow and a sufficient amount of light cannot be ensured.

Accordingly, the invention aims to provide a projector capable of illuminating a liquid crystal panel with uniform illumination light without loss of illumination light during at the time of illumination.

Further, the invention aims to provide a projector capable of illuminating a liquid crystal panel with illumination light from light sources in various sizes in a sufficient amount of light.

SUMMARY

In order to solve the above described problems, a first projector according to the invention includes: (a) a light source optical system for collecting a light source beam from a light source and causing the beam to enter a predetermined position; (b) a rod integrator having an input end disposed in the predetermined position and making the light source beam that has entered the input end uniform and outputting the beam as illumination light from an output end; and (c) a light transmissive type optical modulator unit having an effective pixel region having nearly the same shape and nearly the same size as the output end of the rod integrator and disposed so as to be opposed to the output end. Note that "rod integrator" in this case includes an integrator consisting of not only a solid rod, but also a hollow rod. Further, "nearly the same shape and nearly the same size" means that the output end of the rod integrator and the effective pixel region of the optical modulator unit conform nearly in shape, however, in order to illuminate the entire effective pixel region of the optical modulator unit, it is desired that the shape of the output end is nearly congruent to the shape of the effective pixel region and the size of the output end is slightly larger than the size of the effective pixel region.

In the projector, since the light source beam from the light source is collected and the beam is caused to enter the predetermined position corresponding to the input end of the rod integrator by the light source optical system, regardless of the size, number, or the like of the light source, the light source beam having sufficient brightness can be caused to enter the input end of the rod integrator and propagated within the rod integrator with no loss. Further, in the projector, since the effective pixel region of the light transmissive type optical modulator unit has nearly the same shape and nearly the same size as the output end of the rod integrator and is disposed so as to be opposed to the output end, the uniform illumination light from the output end of the rod integrator can be caused to enter the effective pixel region of the optical modulator unit with no loss or damage to uniformity. Therefore, the optical modulator unit can be illuminated with no loss by illumination light having sufficient brightness and uniformity, and thereby, a high brightness image can be projected.

Further, in a specific aspect of the invention, the light source optical system collects light source beams from a plurality of light sources and causes the beams to enter the input ends, respectively. In this case, the light source beams from the plurality of light sources are introduced into the rod integrator with no loss, and thereby, a higher brightness image can be projected.

Further, in another specific aspect of the invention, the plurality of light sources are formed by arranging a plurality of solid light sources, and the light source optical system includes a lens array having lens elements arranged so as to correspond to the arrangement of the plurality of light sources. In this case, by the integration of the solid light sources, not only the downsizing and efficiency of the light source can be achieved, but also the controllability and handling of the light sources can be improved. As the solid light sources, light emitting diodes can be used, for example.

Further, in yet another specific aspect of the invention, the output end of the rod integrator has a rectangular shape. In this case, the rectangular effective pixel region can be illuminated uniformly and efficiently.

Furthermore, the rod integrator is set to a length in response to light output characteristics from the light source optical system, and thereby, illumination can be performed so as to minimize the non-uniformity of the illumination distribution.

Further, the rod integrator has an optical path conversion member for converting an optical path of the light source beam, and thereby, the optical path direction can be adjusted.

Further, in yet another specific aspect of the invention, the projector further includes a projection optical system for projecting image light modulated by the optical modulator unit. In this case, the image formed by the optical modulator unit is projected to a screen or the like via the projection optical system.

Further, in yet another specific aspect of the invention, the projector further includes: a device drive unit for operating the optical modulator unit in response to an image signal; and a control unit for controlling the operation of the device drive unit. With these units, image processing or correction at the time of projection is performed.

Further, in yet another specific aspect of the invention, the projector further includes: a reflecting member for reflecting image light output through the optical modulator unit; and a screen on which the reflected image light is projected. In this case, the projector is a so-called rear projector for displaying images by rear projection.

Further, a second projector according to the invention includes: (a) light source optical systems for respective colors for collecting light source beams of the respective colors from light sources of the respective colors, respectively, and causing the beams to enter predetermined positions provided with respect to each color; (b) rod integrators for the respective colors having input ends of the respective colors disposed in the predetermined positions with respect to each color, respectively, and independently making the light source beams of the respective colors that have entered the input ends of the respective colors uniform and outputting the beams as illumination light independently from the output ends, respectively; (c) light transmissive type optical modulator units for the respective colors having effective pixel regions having nearly the same shapes and nearly the same sizes as the output ends of the rod integrators for the respective colors and disposed so as to be opposed to the output ends of the respective colors, respectively; (d) a light composition optical system for combining the image light of the respective colors that has been modulated by the optical modulator units of the respective colors, respectively and outputting the light; and (e) a projection optical system for projecting the combined image light through the light composition optical system.

In the projector, since the light source beams of the respective colors from the light sources of the respective colors are collected, respectively, and the beams are caused to enter predetermined positions corresponding to the input ends of the rod integrators for the respective colors, respectively, by the light source optical systems, regardless of the size, number, or the like of the light sources, the light source beams having sufficient brightness can be caused to enter the input ends of the rod integrators for the respective colors with no loss. Further, in the projector, since the effective pixel regions of the optical modulator units of the respective colors have nearly the same shapes and nearly the same sizes as the output ends of the rod integrators for the respective colors and disposed so as to be opposed to these output ends, respectively, the uniform illumination light of the respective colors from the output ends of the rod integrators can be caused to enter the effective pixel regions of the optical modulator units of the respective colors with no loss or damage to uniformity. Therefore, the optical modulator units of the respective colors can be illuminated with no loss by illumination light having sufficient brightness and uniformity, and thereby, a high brightness color image can be projected appropriately via the light composite optical system and the projection optical system.

Further, in a specific aspect of the invention, the light sources for the respective colors have a plurality of light emitting members, respectively, and the light source optical system for the respective colors collect light source beams from the plurality of light emitting members and causes the beams to enter the input ends, respectively. Thereby, the amount of light of the light source beam can be increased. As one more specific aspect, for example, at least one color light source of the light sources of the respective colors has a different number of light emitting members from the other color light sources. In this case, the number of light emitting members as light emitting sources can be adjusted appropriately with respect to each color, and thereby, the amounts of light can be balanced.

Further, the light source optical systems for the respective colors include lens arrays, respectively, and the lens array has lens elements arranged so as to correspond to the number and arrangement of the plurality of light emitting members, and thereby, not only the downsizing and efficiency of the light sources of the respective colors can be achieved, but also the controllability and handling of the light sources can be improved with respect to each color light source.

Further, in another specific aspect of the invention, at least one of the rod integrators for the respective colors has a different length from the other rod integrators. Thereby, the illuminance distributions of the respective colors can be independently adjusted, respectively. As one more specific aspect, for example, the length is set in response to light output characteristics of the respective colors from the optical light source systems for the respective colors. In this case, the respective optical modulator units can be illuminated so that the non-uniformity of the illumination distributions of the respective colors may be minimized. As one further specific aspect, the rod integrators for the respective colors have unique lengths set in response to light output characteristics of the respective colors and brightness balance between the light sources of the respective colors. In this case, illumination can be performed with uniform illumination distributions of the respective colors and uniform brightness balance between the respective colors.

Further, in another specific aspect of the invention, at least one of the rod integrators for the respective colors has a different shape from the other rod integrators. Thereby, the illumination light can be made suitable with respect to each color. As one more specific aspect, for example, at least one of the rod integrators for the respective colors has an optical path conversion member for converting an optical path of each color light source beam. In this case, in one of the rod integrators for the respective colors, the direction of the optical path is changed and the distance adjustment of the optical path can be performed by the optical path conversion member, and thereby, the degree of freedom of accommodating the optical system in a case is increased.

Further, in another specific aspect of the invention, the projector further includes: a reflecting member for reflecting image light output through the projection optical system; and a screen on which the reflected image light is projected. In this case, the projector is a so-called rear projector for displaying images by rear projection.

BRIEF DESCRIPTION OF THE DRAWINGS

FIG. 2(*a*) and (*b*) are a plan view and a side view of the main body part of the projector.

FIG. 3(*a*) and (*b*) are a plan view and a side view of the projector.

DETAILED DESCRIPTION

First Embodiment

Figure 1:
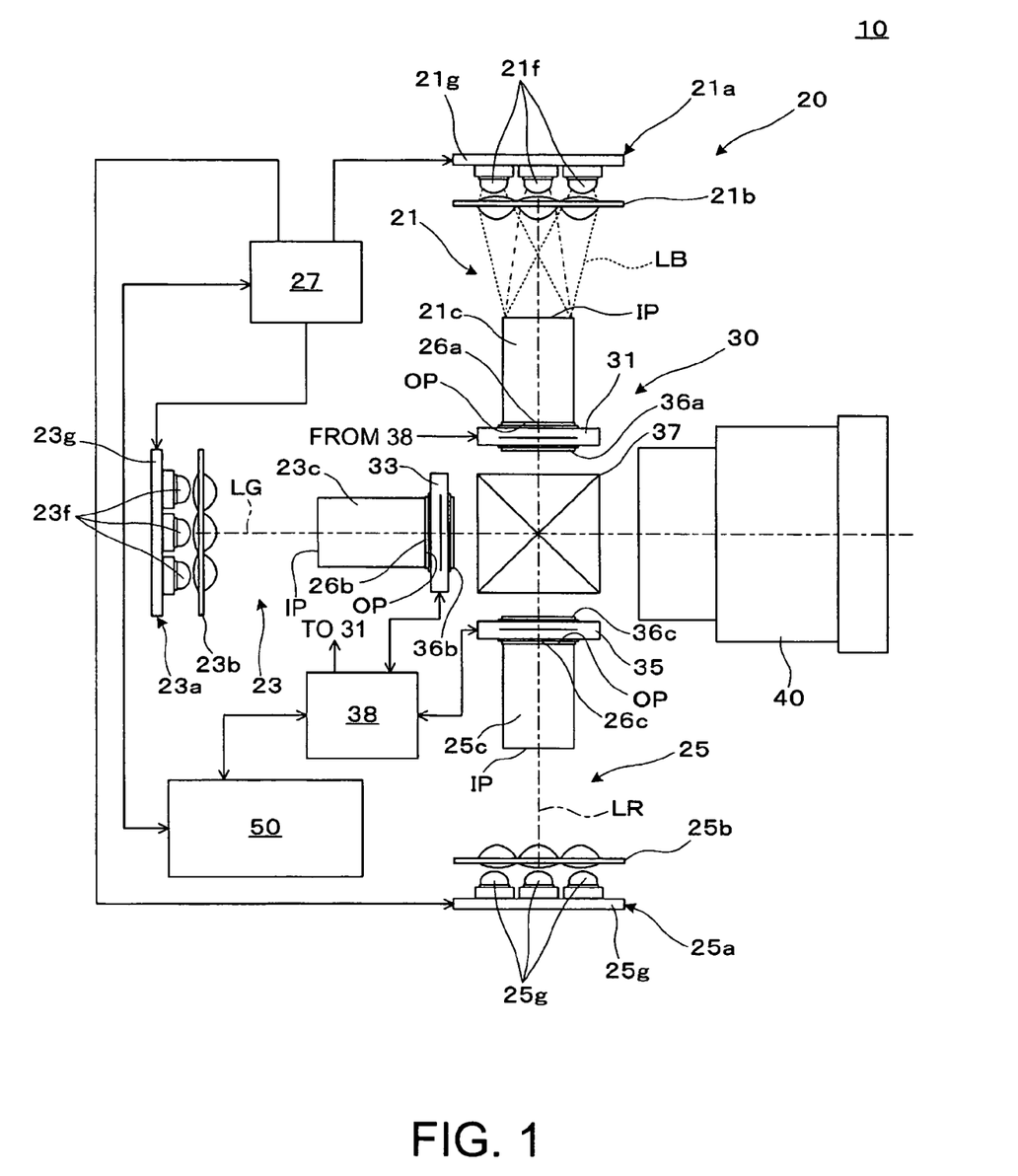
FIG. 1 is a block diagram for schematic explanation of the structure of the projector of the first embodiment.

FIG. 1 is a block diagram for schematic explanation of the structure of a projector according to the first embodiment of the invention. The projector 10 includes an illumination system 20, an optical modulator unit 30, a projection lens 40, and a control unit 50. Here, the illumination system 20 has a B-light illumination device 21 and a G-light illumination device 23, an R-light illumination device 25, and a light source drive unit 27. Further, the optical modulator unit 30 has three liquid crystal light valves 31, 33, 35 for modulating the illumination light in response to image information, a cross dichroic prism 37 as a light composition optical system and a device drive unit 38 for outputting drive signals to the respective liquid crystal light valves 31, 33, 35.

Figure 2A:
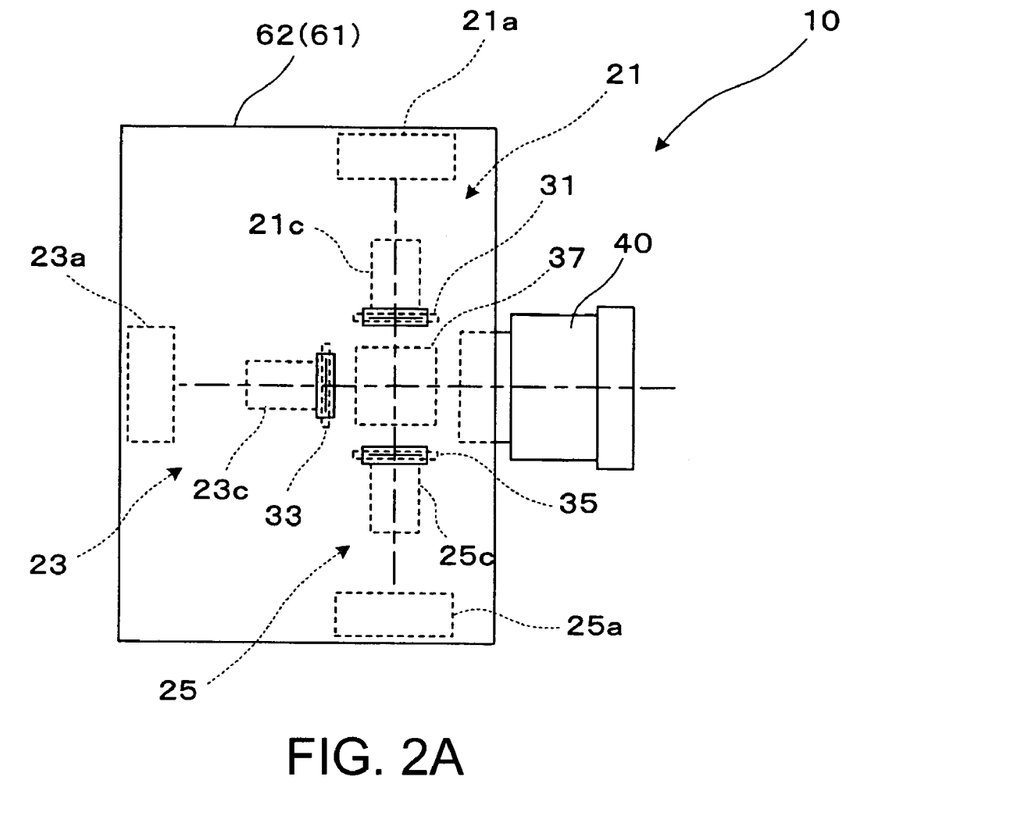
Figure 2B:
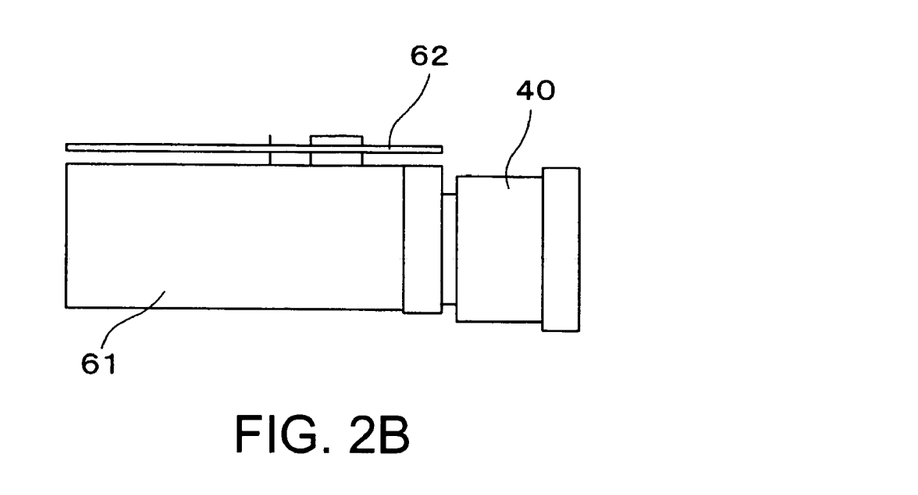
Figure 3A:
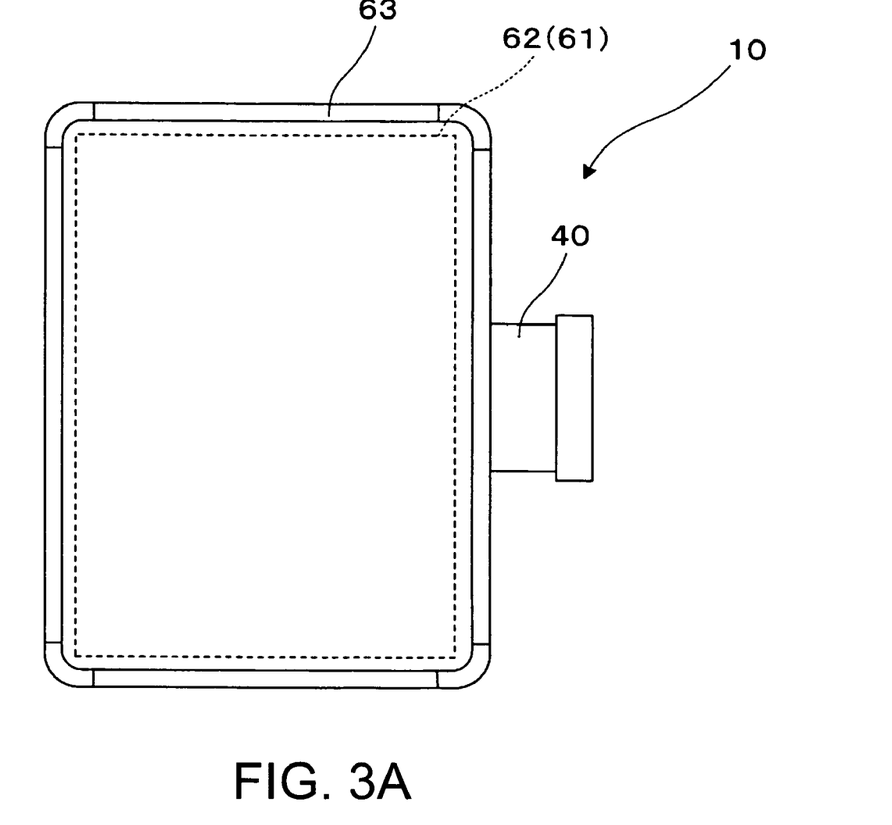
Figure 3B:
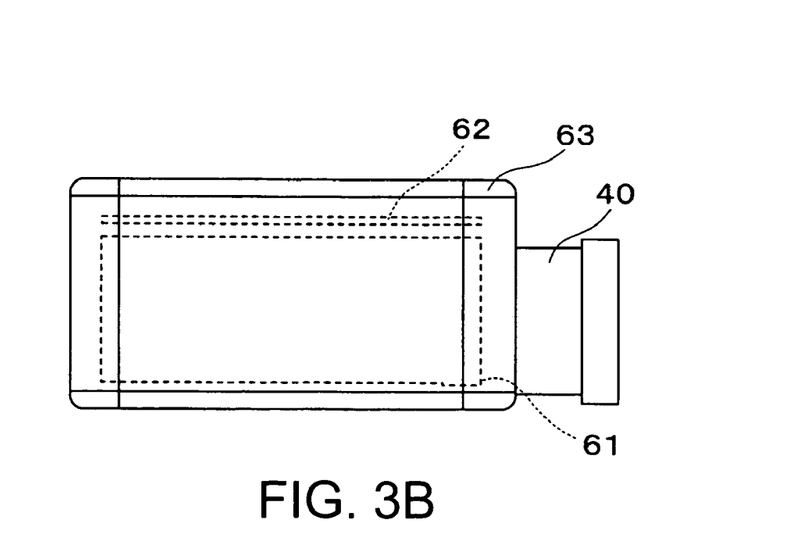

FIG. 2(a) is a plan view showing the state in which the projector 10 shown in FIG. 1 is incorporated in a chassis 61, and FIG. 2(b) is a side view thereof. The respective color light illumination devices 21, 23, 25 and the liquid crystal light valves 31, 33, 35 are fixed in place in the chassis 61, and the projection lens 40 is fixed so as to be embedded in one side surface of the chassis 61. Further, the light source drive unit 27, the device drive unit 38, and the control unit 50 shown in FIG. 1 are mounted on a circuit board 62 provided so as to be opposed to the upper surface of the chassis 61. FIG. 3(a) is a plan view for explanation of the appearance of the projector 10 shown in FIG. 1, and FIG. 3(b) is a side view thereof. As clearly seen from the drawings, the projector 10 is formed by accommodating the chassis 61 and the circuit board 62 shown in FIGS. 2(a) and 2(b) in a suitable case 63.

Turning back to FIG. 1, the B-light illumination device 21 includes a B-light light source unit 21a and a rod integrator 21c. Of these, the B-light light source unit 21a is formed by mounting plural LEDs 21f, which are called solid light sources, on a circuit board 21g in a suitable two-dimensional arrangement (e.g., a matrix arrangement) and has a collection lens array 21b in which lens elements for beam shaping are disposed independently on the front sides of the respective LEDs 21f. Each of the LEDs 21f is a ready-made product in a standard size and generates B light within the category of blue (B) of the three primary colors. The B light taken out from the LED 21f, i.e., first light source beam LB travels through the collection lens array 21b, and then enters an input end, i.e., an input port IP of the rod integrator 21c as means for making light uniform. At this time, the B light from each LED 21f is diffused appropriately and made into a beam having a circular section collected in a predetermined position by each lens element that forms the collection lens array 21b. That is, the B light from the respective LEDs 21f as a whole is collected onto the rectangular input port IP provided in the rod integrator 21c as the predetermined position, and enters the input port IP in an overlapping state without leakage. The first illumination light LB output through the rod integrator 21c from an output port OP as an output end thereof enters the B-light liquid crystal light valve 31 of the optical modulator unit 30 via a first polarizing filter 26a disposed so as to be opposed to the output port OP. Thereby, an illuminated area (an effective pixel area in which image information is formed) on the liquid crystal light valve 31 is illuminated by the B light uniformly. In that, the top lenses of the LEDs 21f and the collection lens array 21b form a light source optical system for collecting the first light source beam LB and causing it to enter the rod integrator 21c.

The G-light illumination device 23 includes a G-light light source unit 23a and a rod integrator 23c. Of these, the G-light light source unit 23a has the same constitution as the B-light light source unit 21a, and each of LEDs 23f on a circuit board 23g generates G light within the category of green (G) of the three primary colors and second light beams LG consisting of the G light travel through a collection lens array 23b, and then overlap and enter an input end, i.e., an input port IP of the rod integrator 23c without leakage. The second illumination light LG traveling through the rod integrator 23c has been made uniform without loss by wavefront splitting and overlapping, and enters the G-light liquid crystal light valve 33 of the optical modulator unit 30 via a first polarizing filter 26c disposed so as to be opposed to an output port OP thereof. Thereby, an illuminated area (an effective pixel area in which image information is formed) on the liquid crystal light valve 33 is illuminated by the G light uniformly.

The R-light illumination device 25 includes an R-light light source unit 25a and a rod integrator 25c. Of these, the R-light light source unit 25a has the same constitution as the B-light light source unit 21a, and each of LEDs 25f on a circuit board 25g generates R-light within the category of red (R) of the three primary colors and third light beams LR consisting of the R light travel through a collection lens array 25b, and then overlap and enter an input end, i.e., an input port IP of the rod integrator 25c without leakage. The third illumination light LR traveling through the rod integrator 25c has been made uniform without loss by wavefront splitting and overlapping, and enters the R-light liquid crystal light valve 35 of the optical modulator unit 30 via a first polarizing filter 26c disposed so as to be opposed to an output port OP thereof. Thereby, an illuminated area (an effective pixel area in which image information is formed) on the liquid crystal light valve 35 is illuminated by the R light uniformly.

The respective liquid crystal light valves 31, 33, 35 are light transmissive type optical modulator units and switch the direction of polarization of the illumination light in response to externally input image signals to two-dimensionally modulate the illuminated light that has entered the respective liquid crystal light valves 31, 33, 35 from the respective color light illumination devices 21, 23, 25, respectively. On the input sides of the respective liquid crystal light valves 31, 33, 35, the first polarizing filters 26a, 26b, 26c are disposed so as to be opposed to the input surfaces thereof, and thereby, the respective liquid crystal light valves 31, 33, 35 can be illuminated by the components of polarization in specific directions. Further, on the output sides of the respective liquid crystal light valves 31, 33, 35, second polarizing filters 36a, 36b, 36c are disposed so as to be opposed to the output surfaces thereof, and thereby, only the components of polarization perpendicular to the specific directions, which have passed through the respective liquid crystal light valves 31, 33, 35, can be read out. The illumination light from the respective color light illumination devices 21, 23, 25 that has entered the respective liquid crystal light valves 31, 33, 35, respectively, is two-dimensionally modulated by these liquid crystal light valves 31, 33, 35, respectively. The image light of the respective colors that has entered the respective liquid crystal light valves 31, 33, 35 is combined by the cross dichroic prism 37 and output from one side surface thereof. The image of the composite light that has been output from the cross dichroic prism 37 enters the projection lens 40 as a projection optical system and is projected on a screen (not shown) with a suitable magnifying power. That is, a color image formed by combining the images of the respective colors B, G, R formed on the respective liquid crystal light valves 31, 33, 35 is projected on the screen as a moving image or still image.

The control unit 50 is connected to the light source drive unit 27 and the device drive unit 38, respectively, and controls the operation of the respective color light illumination devices 21, 23, 25 via the light source drive unit 27. Further, the control unit 50 transmits the image signals processed in the control unit 50 to the respective liquid crystal light valves 31, 33, 35 via the device drive unit 38, and, simultaneously, performs various kinds of image processing such as trapezoidal correction on the image signals.

Figure 4:
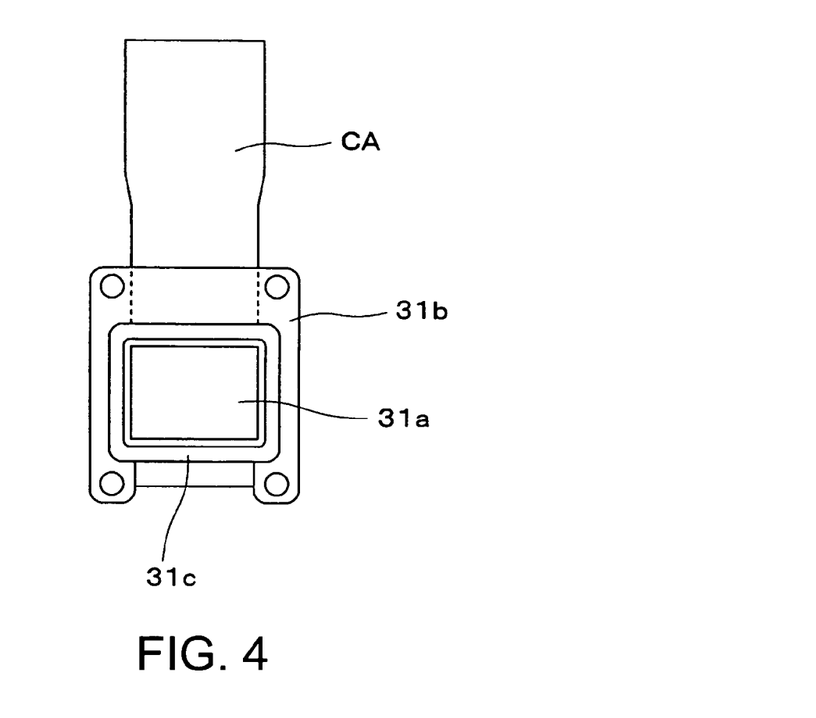
FIG. 4 is a front view of the liquid crystal light valve.

FIG. 4 is a front view of the B-light liquid crystal light valve 31. This liquid crystal light valve 31 has a main body part 31a fitted and fixed in a frame 31b, and a cable CA for transmitting the image signals to the main part 31a extends from the upper portion of the frame 31b. Around the main body part 31a exposed in the front surface, a protruding edge portion 31c is provided so as to fix the first polarizing filter 26a with an adhesive or adhesion bond. Further, although not shown, the second polarizing filter 36a (see FIG. 1) can be attached to the rear surface of the liquid crystal light valve 31 similarly. By the way, the first polarizing filter 26a, the second polarizing filter 36a, and the like can be attached directly to the surface of the main body part 31a. Although the description is omitted here, the other liquid crystal light valves 33, 35 have the same structure as the B-light liquid crystal light valve 31.

Figure 5:
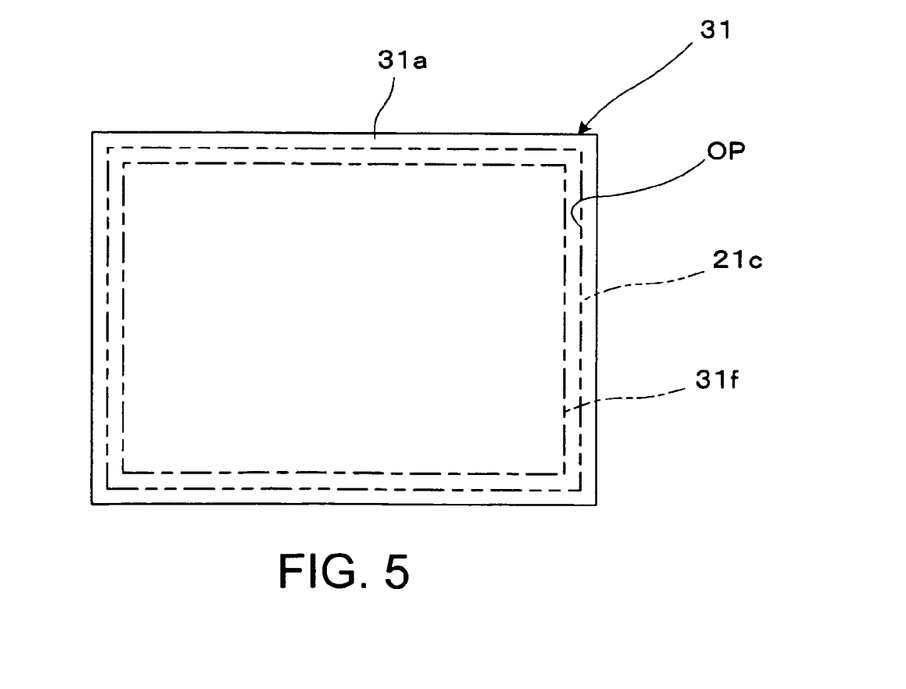
FIG. 5 is a diagram for explanation of the positional relationship between the liquid crystal light valve and the rod integrator.

FIG. 5 is a diagram for explanation of the positional relationship between the liquid crystal light valve 31 and the rod integrator 21c shown in FIG. 1 and so on. In the main body part 31a of the liquid crystal light valve 31, less than the entire exposed part is a display area. Instead, for example, a central part (except the edge portion that is about a tenth of the longitudinal dimension) is an effective pixel area 31f. That is, because only the illumination light that has entered the central effective pixel area 31f can be modulated, the illumination light that has entered the outside thereof is wasted. On the other hand, it is difficult to allow the illumination light to enter the central effective pixel area 31f only, and the load of the alignment work of the rod integrator 21c with the liquid crystal light valve 31 is increased. Accordingly, the shape of the output port OP of the rod integrator 21c is made to have nearly the same similar shape as the effective pixel area 31f and the size of the output port OP of the rod integrator 21c is made slightly larger than the effective pixel area 31f. Note that, in order to reduce the waste of illumination light as much as possible, the size of the output port OP is made smaller than the size of the exposed portion of the main body part 31a and the sizes of the output port OP and the effective pixel area 31f are made nearly the same. By the way, because the output port OP at the tip end of the rod integrator 21c is disposed extremely closely to the main body part 31a, though via the first polarizing filter 26a, the illumination light output from the output port OP is hardly diffused but enters the main body part 31a, and thereby, the effective pixel area 31f can be illuminated efficiently and uniformly. In a specific fabricated example, the longitudinal and lateral dimensions of the exposed portion of the main body part 31a are set to 12.8 mm×16.4 mm, the dimensions of the effective pixel area 31f are set to 10.8 mm×14.4 mm, and the dimensions of the output port OP of the rod integrator 21c are set to 10.83 mm×14.43 mm. Further, the distance between the output port OP of the rod integrator 21c and the surface of the main body part 31a is set to 0.5 mm. As above, the size and positioning of the rod integrator 21c relative to the liquid crystal light valve 31 are described, however, the size and positioning of the rod integrators 23c, 25c relative to the other liquid crystal light valves 33, 35 are the same as described above, and thereby, the illumination light output from the rod integrators 23c, 25c can be caused to enter the effective pixel areas of both liquid crystal light valves 33, 35 with almost no waste, and these are uniformly illuminated.

The operation of the projector 10 will be described below with reference to FIG. 1. The illumination light of the respective colors from the BGR light illumination devices 21, 23, 25 enters the corresponding liquid crystal light valves 31, 33, 35, respectively. The respective liquid crystal light valves 31, 33, 35 are driven by the device drive unit 38 that operates in response to external image signals so as to have two-dimensional refractive index distributions and two-dimensionally modulates the illumination light of the respective colors in units of pixel. Thus, the illumination light modulated by the respective liquid crystal light valves 31, 33, 35, i.e., image light is combined by the cross dichroic prism 37 and then enters the projection lens 40 as the projection optical system so as to be projected. In this case, the sectional shapes of the rod integrators 21c, 23c, 25c for the respective colors, i.e., the shapes of the output ports OP thereof are made nearly the same as the shapes of the effective pixel areas of the liquid crystal light valves 31, 33, 35 opposed thereto, respectively, and the sizes of the output ports OP of the rod integrators 21c, 23c, 25c for the respective colors are made slightly larger than the effective pixel areas 31f opposed thereto, respectively. As a result, the uniform illumination light output from the output ports OP of the rod integrators 21c, 23c, and 25c can be caused to enter the effective pixel areas 31f of the liquid crystal light valves 31, 33, 35 of the respective colors without loss or damage to the uniformity. That is, the liquid crystal light valves 31, 33, 35 can be illuminated without loss by illumination light having sufficient brightness and uniformity, and thereby, a high brightness image can be projected.

Second Embodiment

A projector according to the second embodiment of the invention will be described below. Since the projector of the second embodiment is a modification of the projector of the first embodiment, the description of the common parts will be omitted and only the different parts will be described.

Figure 6A:
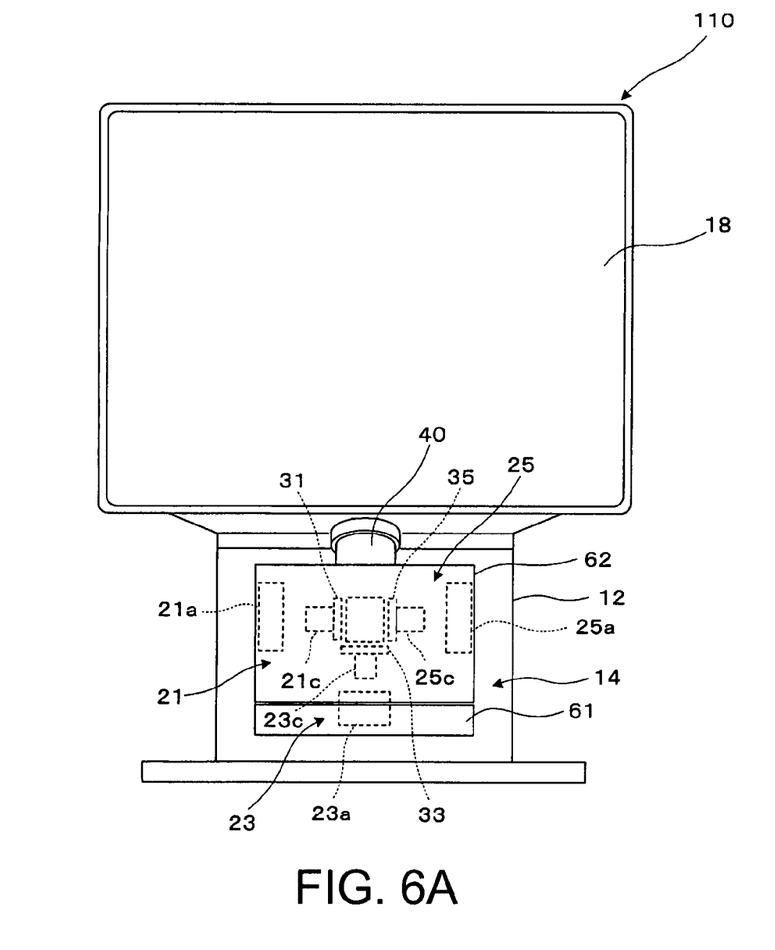
FIG. 6(a) and (b) are diagrams for explanation of the projector of the second embodiment.
Figure 6B:
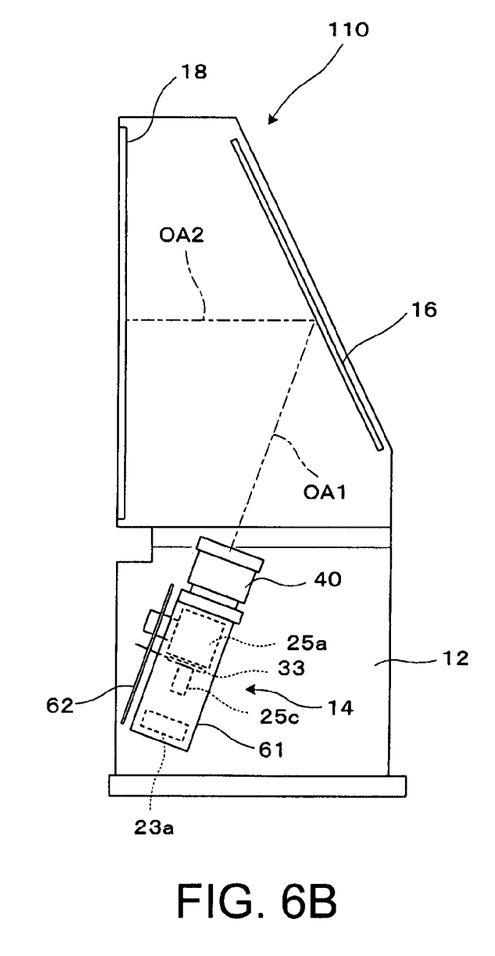

FIGS. 6(a) and 6(b) are a partial broken front view and a side view for explanation of the structure of the projector according to the second embodiment. This projector 110 is a rear projection type apparatus for displaying images by rear projection, and includes a projector main body 14 at the bottom of a case 12 as a casing, a reflecting mirror 16 at the rear upper portion within the case 12, and a transmissive type screen member 18 on the front face of the case 12. The image light output from the projector main body 14 travels rearwards and diagonally upwards with an optical axis OA1 as a center, is bent toward the front face side by the reflecting mirror 16 with an optical axis OA2 as a center, and enters the transmissive type screen member 18. Note that the projector main body 14, the reflecting mirror 16, and the transmissive type screen member 18 are positioned and fixed within the case 12 by means, which is not shown.

Here, the projector main body 14 corresponds to the projector 10 shown in FIGS. 1 and 2, has the respective light illumination devices 21 to 25 and liquid crystal light valves 31 to 35 built therein, and includes the chassis 61 embedded with the projection lens 40 and the circuit board 62 on which the light source drive unit 27, the device drive unit 38, and the control unit 50 shown in FIG. 1 are mounted.

In the case of the second embodiment, similarly, the sectional shapes of the rod integrators 21c, 23c, 25c for the respective colors, i.e., the shapes of the output ports OP thereof are made nearly the same as the shapes of the effective pixel areas of the liquid crystal light valves 31, 33, 35 opposed thereto, respectively, and the sizes of the output ports OP of the rod integrators 21c, 23c, 25c for the respective colors are made slightly larger than the sizes of the effective pixel areas of the liquid crystal light valves 31, 33, 35 opposed thereto, respectively. As a result, the uniform illumination light output from the output ports OP of the rod integrators 21c, 23c, and 25c can be caused to enter the effective pixel areas 31f of the liquid crystal light valves 31, 33, 35 of the respective colors without loss or damage to the uniformity.

Third Embodiment

A projector according to the third embodiment of the invention will be described below. The projector of the third embodiment is a modification of the projector of the first embodiment.

Figure 7:
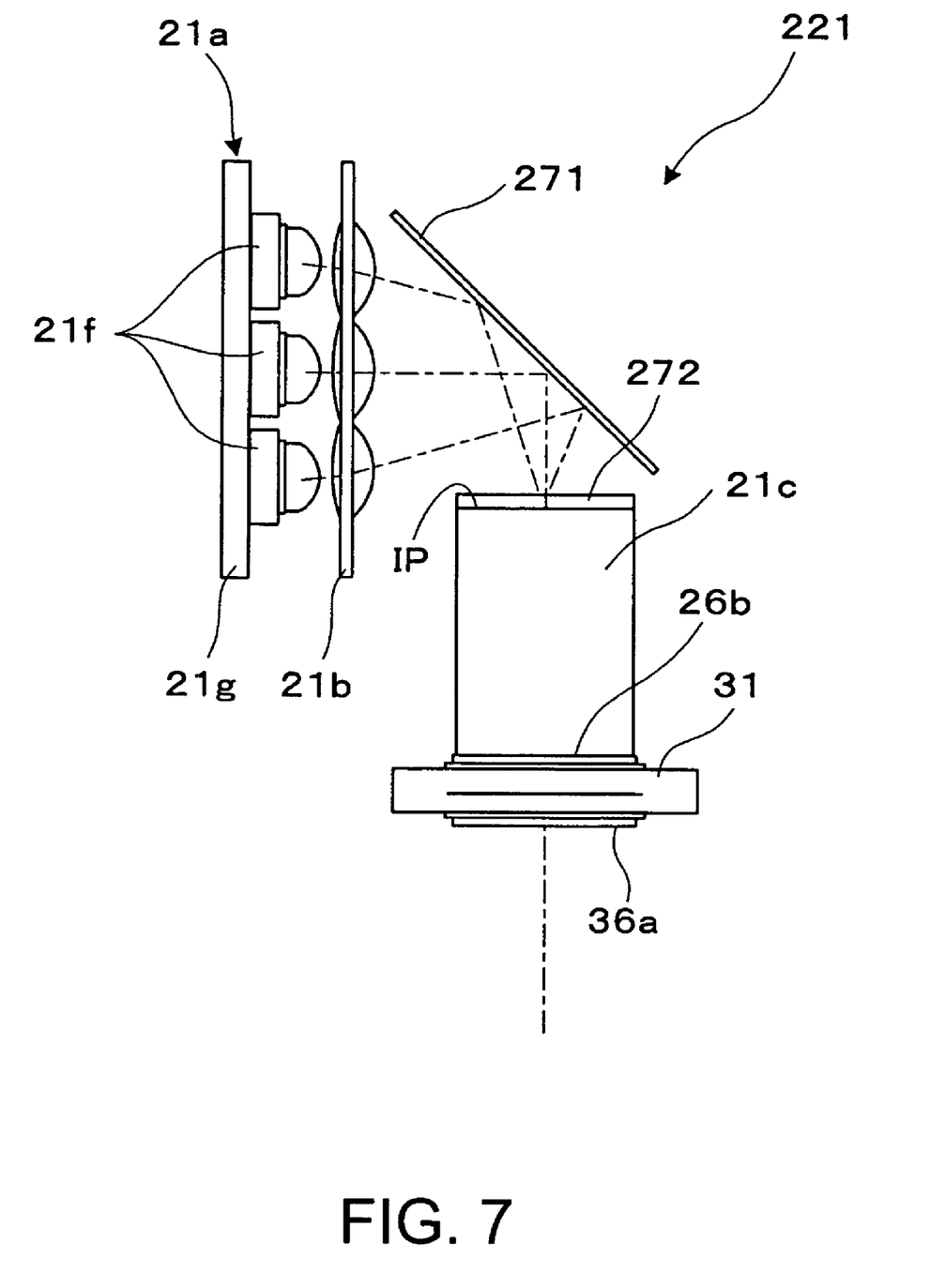
FIG. 7 is a diagram for explanation of the third embodiment.

FIG. 7 is a diagram for explanation of a B-light illumination device 221 incorporated in the projector of the third embodiment. This B-light illumination device 221 includes a mirror 271 for optical path bending as an optical path conversion member and a polarization conversion element 272 for converting the illumination light into polarized light in a specific direction other than the B-light light source unit 21a, the rod integrator 21c, etc. In this case, the B light output from the respective LEDs 21f provided in the B-light light source unit 21a overlaps and enters the polarization conversion element 272 via the mirror 271. The polarization conversion element 272 is attached to the input port IP of the rod integrator 21c, and converts the B light immediately before entering the rod integrator 21c into polarized light in a specific direction. Thereby, the first polarizing filter 26a can be illuminated without waste and the first polarizing filter 26a can be prevented from being heated.

By the way, in the above description, only the B-light illumination device 221 is described, however, similarly, the G-light illumination device and the R-light illumination device have the same structure, and, with respect to G light and R light, the first polarizing filters can be illuminated without waste and they can be prevented from being heated.

Fourth Embodiment

A projector according to the fourth embodiment of the invention will be described below. The projector of the fourth embodiment is a modification of the projector of the first embodiment.

Figure 8:
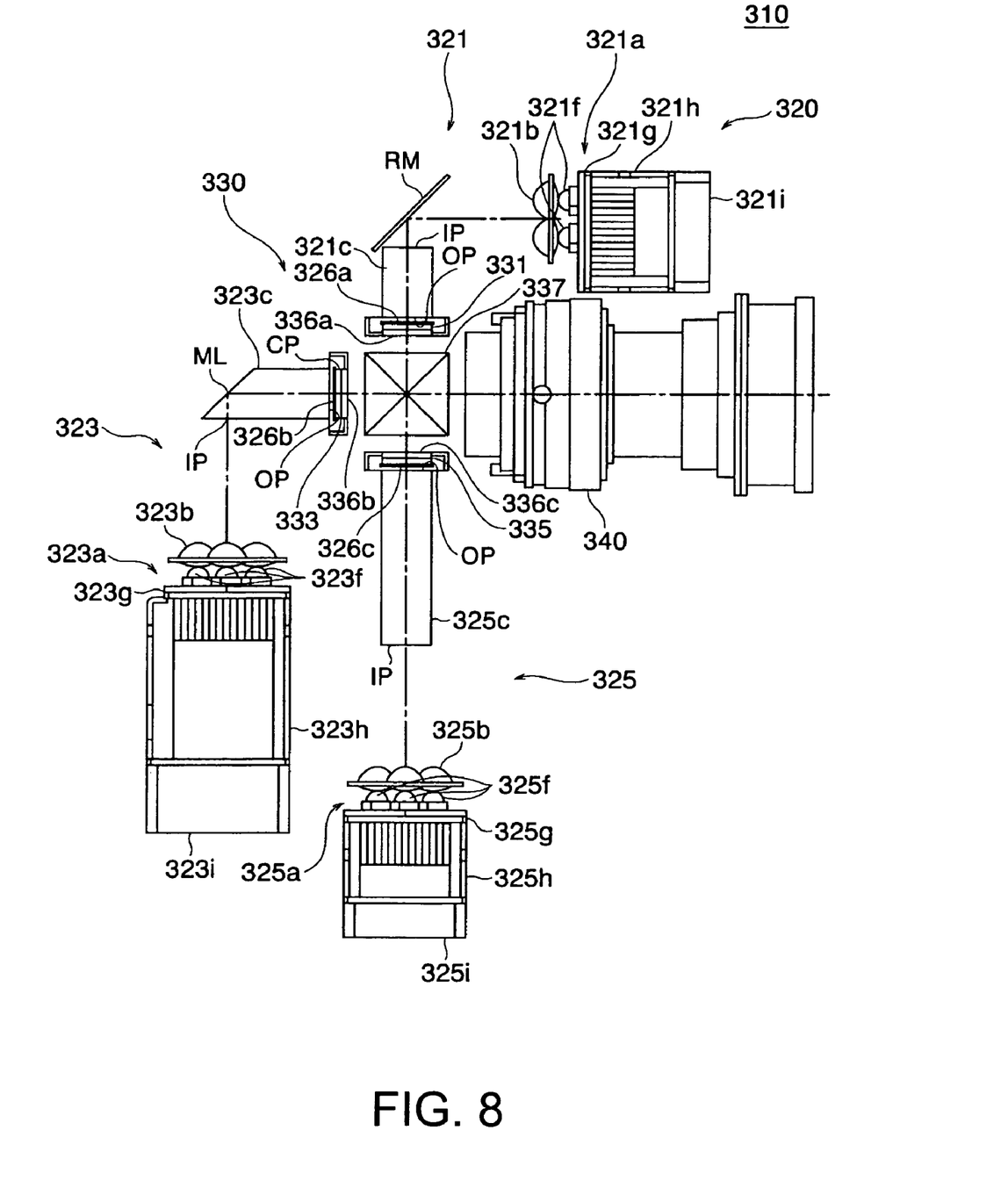
FIG. 8 is a diagram for explanation of the structure of the projector of the fourth embodiment.

FIG. 8 shows the structure of the projector according to the fourth embodiment. This projector 310 includes an illumination system 320, an optical modulator unit 330, a projection lens 340, and a control unit (not shown) as well as the projector 10 in FIG. 1. Here, the illumination system 320 has a B-light illumination device 321, a G-light illumination device 323, an R-light illumination device 325, and a light source drive unit (not shown). Further, the optical modulator unit 330 has three liquid crystal light valves 331, 333, 335 for modulating the illumination light in response to image information, a cross dichroic prism 337 as a light composition optical system and a device drive unit (not shown) for outputting drive signals to the respective liquid crystal light valves 331, 333, 335.

The operation of the light source and device drive units and the control unit is not shown because it is the same as in the projector 10 of the first embodiment and the description thereof will be omitted.

The B-light illumination device 321 includes an air-cooling fan 321i, a cooling fin 321h, a B-light light source unit 321a, a mirror RM, and a rod integrator 321c. Of these, the B-light light source unit 321a has a circuit board 321g on which plural (four in the shown example) LEDs 321f are mounted and a collection lens array 321b.

Each LED 321f generates B light. The B light taken out from the LED 321f travels through the collection lens array 321b, and then is converted into polarized light in a specific direction by the mirror RM for optical path bending as an optical path conversion member, and enters an input port IP of the rod integrator 321c. The B light output through the rod integrator 321c from an output port OP enters the B-light liquid crystal light valve 331 of the optical modulator unit 330 via a first polarizing filter 326a disposed so as to be opposed to the output port OP. Thereby, an illuminated area nearly congruent to the end surface of the output port OP on the liquid crystal light valve 331 is illuminated by the B light uniformly. Simultaneously, the heat accompanied by the generation of the B light in the respective LEDs 321f is cooled by the air-cooling fan 321i and the cooling fin 321h. The heat conducts to the cooling fin 321h and, by further cooling the cooling fin 321h to which the heat has conducted by the air-cooling fan 321i, the heat is released to the outside and the temperature of the respective LEDs 321f is kept at constant.

The G-light illumination device 323 has the same structure as the B-light illumination device 321, and includes an air-cooling fan 323i, a cooling fin 323h, a G-light light source unit 323a, and a rod integrator 323c. Note that the rod integrator 323c is different from the B-light rod integrator 321c in shape and length and has a prismatic part in the input part, and further includes a dielectric multilayer film ML as an optical path conversion member on the inclined surface of the prismatic part. Further, the G-light light source unit 323a also has the same structure as the B-light light source unit 321a, and, for example, seven LEDs 323f are mounted on a circuit board 323g and each of the LEDs 323f emits G light. The G light enters an input port IP provided on the side surface of the rod integrator 323c through a collection lens array 323b. After the entrance, the optical path of the light is bent 90° by the dielectric multilayer film ML that has been attached to the prismatic part of the rod integrator 323c. The G light that has passed through the rod integrator 323c enters the G-light liquid crystal light valve 333 via a first polarizing filter 326b disposed so as to be opposed to an output port OP. Thereby, an illuminated area nearly congruent to the end surface of the output port OP on the liquid crystal light valve 333 is illuminated by the G light uniformly. Further, the heat accompanied by the generation of the G light in the respective LEDs 323f is transmitted by the air-cooling fan 323i and the cooling fin 323h, and the respective LEDs 323f are cooled.

The R-light illumination device 325 includes an air-cooling fan 325i, a cooling fin 325h, an R-light light source unit 325a, and a rod integrator 325c. Of these, the R-light light source unit 325a has the same structure as the B-light light source unit 321a, and, for example, seven LEDs 325f are mounted on a circuit board 325g and each of the LEDs 325f emits R light. The R light enters an input port IP provided on an end surface of the rod integrator 325c that is set longer than the rod integrator 321c through a collection lens array 325b. The R light that has passed through the rod integrator 325c enters the R-light liquid crystal light valve 335 via a first polarizing filter 326c disposed so as to be opposed to an output port OP. Thereby, an illuminated area nearly congruent to the end surface of the output port OP on the liquid crystal light valve 335 is illuminated by the R light uniformly. Further, the heat accompanied by the generation of the R light in the respective LEDs 325f is transmitted by the air-cooling fan 325i and the cooling fin 325h, and the respective LEDs 325f are cooled.

At the input sides of the respective liquid crystal light valves 331, 333, 335, the first polarizing filters 326a, 326b, 326c are disposed so as to be opposed to the input surfaces. Further, at the output sides of the respective liquid crystal light valves 331, 333, 335, the second polarizing filters 136a, 136b, and 136c are disposed so as to be opposed to the output surfaces. The illumination light from the respective color light illumination devices 321, 323, 325 that has entered the liquid crystal light valves 331, 333, 335 is two-dimensionally modulated by these liquid crystal light valves 331, 333, 335. The image light of the respective colors that has passed through the respective liquid crystal light valves 331, 333, 335 is combined by the cross dichroic prism 337 and output from one surface thereof. The image of the composite light that has been output from the cross dichroic prism 337 enters the projection lens 340 as a projection optical system and is projected with a suitable magnifying power on a screen (not shown).

Figure 9A:
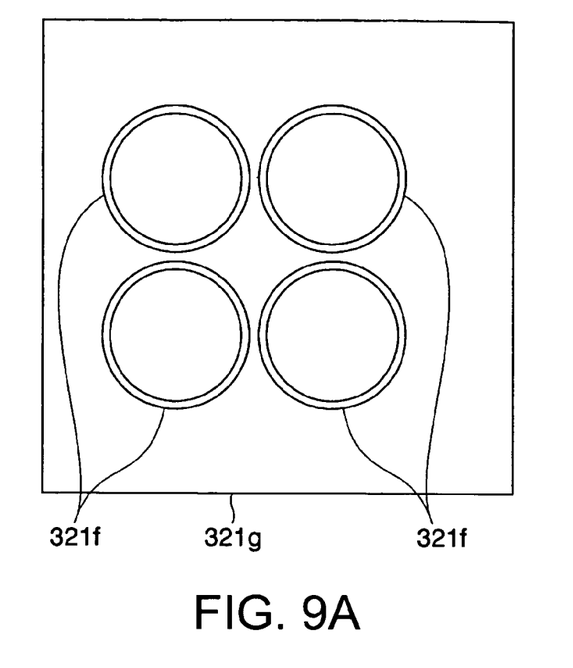
FIG. 9(a) and (b) are plan views showing the structure of the light source unit.
Figure 9B:
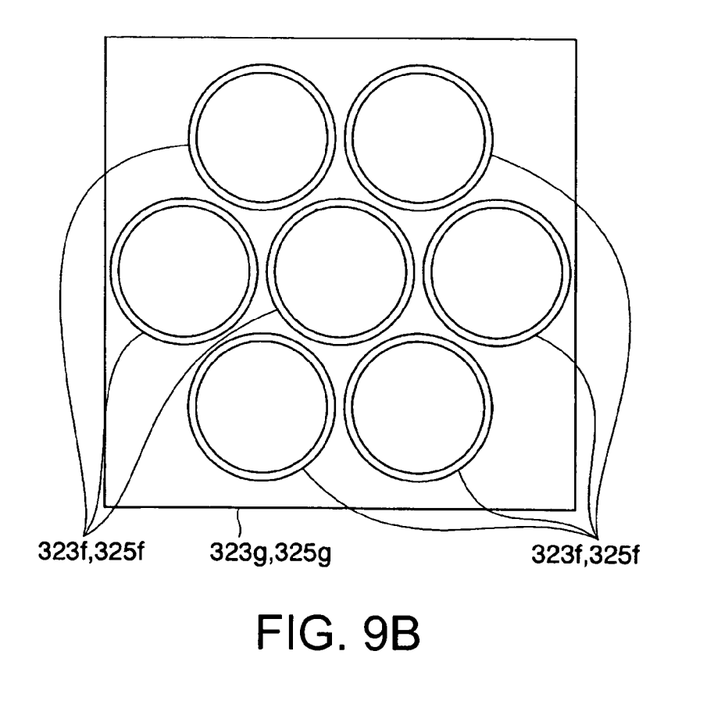

FIGS. 9(a) and 9(b) are plan views for showing the arrangements of the LEDs 321f, 323f and 325f as light emitting members in the embodiment. FIG. 9(a) is a plan view of the B-light light source unit 321a. In the embodiment, four LEDs 321f are regularly arranged on the circuit board 321g as a B-light light source. FIG. 9(b) is a plan view of the G-light light source unit 323a and the R-light light source unit 325a. In the embodiment, seven LEDs 323f and 325f are regularly arranged on the circuit boards 323g and 325g as G-light and R-light light sources. In the embodiment, as described above, the seven LEDs 323f and LEDs 325f are arranged regularly on the circuit boards 323g and 325g as light sources of G light and R light.

In either case, the collection lens arrays 321b, 323b, 325b shown in FIG. 8 are designed in response to the arrangements of the LEDs 321f, 323f, 325f, and the light of the respective colors overlap with no loss and input to the input ports IP uniformly.

Thereby, variations in illumination light caused by the difference between amounts of emitted light of unit LEDs, which are different depending on the LEDs of the respective colors, can be suppressed. Further, the lengths and sizes of the air-cooling fans 321i, 323i, and 325i and the cooling fins 321h, 323h, and 325h may be appropriately determined in response to the amount of heat generation, which are different in the respective color light illumination devices.

In the embodiment, the number of the B-light LEDs 321f is set to four and the numbers of the G-light LEDs 323f and R-light LEDs 325f are set to seven, however, needless to say, these numbers can be changed appropriately in the design stage in response to the application of the projector, the brightness of the used LEDs, or the like.

Further, the lengths and shapes of the rod integrators 321c, 323c, 325c of the respective colors are set in response to brightness distributions of the input illumination light of the respective colors, respectively. Thereby, the differences in brightness between the respective colors can be suppressed and the entire uniformization and the reduction in color irregularities can be achieved in the image light formation.

The light emitting members in the above description of the fourth embodiment are not limited to those in the embodiment. For example, in the first embodiment, the number, arrangement, intervals, or the like of the LEDs 21f, 23f, 25f as light emitting members in the respective color light illumination devices 21, 23, 25 can be changed appropriately in response to the specification of the projector. That is, the total number or the relative number ratio of the LEDs 21f, 23f, and 25f can be changed, and, for example, brightness increased, such that the total amount of light is doubled by increasing the number of the light emitting members of the respective colors. In this case, it is possible that the white balance changes with the increase of the light emitting members, however, the change of the white balance can be compensated by adjusting the number ratio of the light emitting members relating to the respective colors of RGB.

Further, similarly, the shapes and structures of the collection lens arrays 21b, 23b, 25b, 321b, 323b, 325b in the respective color light illumination devices 21, 23, 25, 321, 323, 325 can be changed appropriately in response to the specification of the projector. Thereby, the incident angle ranges of the illumination light that enters the rod integrators 21c, 23c, 25c, 321c, 323c, 325c for the respective colors can be adjusted, and, as a result, view angle ranges of the illumination light that enters the liquid crystal light valves 31, 33, 35, 331, 333, 335 for the respective colors can be freely controlled to some degree.

Further, the first polarizing filters 26a, 26b, 26c, 326a, 326b, 326c are disposed between the output ports OP of the rod integrators 21c, 23c, 25c, 321c, 323c, 325c for the respective colors and the liquid crystal light valves 31, 33, 35, 331, 333, 335 for the respective colors, however, they can be disposed on the input port IP sides or within the rod integrators 21c, 23c, 25c, 321c, 323c, 325c.

Moreover, in place of the projectors 10, 310, and the like as in the above described embodiments, a projector for collecting a light source beam from a white light source by a mirror or the like and causing the beam to enter an input end of a rod integrator to obtain uniform illumination light at an output end of the rod integrator and directly illuminating a single color display type liquid crystal light valve opposingly disposed at the output end of the rod integrator with the illumination light can be adopted. In this case, similarly, using the rod integrator 21c or the like as in the above described embodiments, the light source beam from the white light source can be utilized efficiently and the effective pixel region of the liquid crystal light valve can be illuminated uniformly and efficiently.

What is claimed is:
1. A projector comprising:
light source optical systems for respective colors collecting light source beams of the respective colors from light sources of the respective colors, respectively, and causing the beams to enter predetermined positions provided with respect to each color, at least one light source of the respective colors having a different number of light-emitting members from the other light sources of the respective colors;
rod integrators for the respective colors having input ends of the respective colors disposed in the predetermined positions with respect to each color, respectively, and independently making the light source beams of the respective colors that have entered the input ends of the respective colors uniform and outputting the beams as illumination light independently from the output ends, respectively, at least one rod integrator of the respective colors having a different length than the other rod integrators of the respective colors;

light transmissive type optical modulator units for the respective colors each including a main body part having a cross-section greater than the output end of a respective rod integrator and an effective pixel region extending across a portion of and centrally located on the main body part, each of the effective pixel regions having substantially the same shapes and sizes as the output ends of the rod integrators for the respective colors and disposed so as to be opposed to the output ends of the respective colors;

a light composition optical system for combining image light of the respective colors that has been modulated by the optical modulator units of the respective colors, respectively and outputting the light; and a projection optical system for projecting the combined image light through the light composition optical system.

2. The projector according to claim 1, wherein the light sources for the respective colors have a plurality of light emitting members, respectively, and the light source optical systems for the respective colors collect light source beams from the plurality of light emitting members and cause the beams to enter the input ends, respectively.

3. The projector according to claim 1, wherein at least one of the rod integrators for the respective colors has an optical path conversion member for converting optical path of the light source beam of each color.

4. A rear projection type projector according to claim 1, further comprising:

a reflecting mirror for reflecting image light output through the projection optical system; and a screen member on which the reflected image light is projected.

* * * * *